(12) United States Patent
Gratsias et al.

(10) Patent No.: US 7,882,610 B2
(45) Date of Patent: Feb. 8, 2011

(54) RAZOR HEAD HAVING LASER WELDED PARTS AND METHOD OF PRODUCING THEREOF

(75) Inventors: Spiros Gratsias, Attiki (GR); Bozikis Ioannis, Attiki (GR); Dimitris Efthimiadis, Attiki (GR)

(73) Assignee: Bic-Violex S.A., Anixi, Attiki (GR)

( * ) Notice: Subject to any disclaimer, the term of this patent is extended or adjusted under 35 U.S.C. 154(b) by 265 days.

(21) Appl. No.: 11/568,761

(22) PCT Filed: May 6, 2004

(86) PCT No.: PCT/EP2004/005745

§ 371 (c)(1),
(2), (4) Date: Nov. 6, 2006

(87) PCT Pub. No.: WO2005/108024

PCT Pub. Date: Nov. 17, 2005

(65) Prior Publication Data

US 2008/0000090 A1    Jan. 3, 2008

(51) Int. Cl.
*B21J 15/02* (2006.01)
*B26B 21/00* (2006.01)

(52) U.S. Cl. ............... 29/524.1; 29/525.06; 29/525.14; 30/50

(58) Field of Classification Search ............ 30/32, 30/50, 60.5, 75, 84, 335, 352, 43.2, 51; 76/104, 76/104.1; 29/524.1, 525.06, 525.14
See application file for complete search history.

(56) References Cited

U.S. PATENT DOCUMENTS

| 3,769,117 | A |   | 10/1973 | Bowen et al. |
| 3,889,370 | A | * | 6/1975  | Hale, III ............... 30/346.58 |
| 4,345,374 | A | * | 8/1982  | Jacobson ............... 30/47 |
| 4,813,137 | A | * | 3/1989  | Halevy ............... 30/50 |
| 5,060,377 | A | * | 10/1991 | Althaus et al. ............... 30/50 |
| 5,253,420 | A |   | 10/1993 | Althaus et al. |
| 5,276,967 | A | * | 1/1994  | Ferraro et al. ............... 30/49 |
| 5,331,740 | A | * | 7/1994  | Carson et al. ............... 30/50 |
| 5,501,014 | A | * | 3/1996  | Hegemann ............... 30/50 |
| 5,526,567 | A | * | 6/1996  | Carson et al. ............... 30/50 |
| 6,633,018 | B2 | * | 10/2003 | Shikoda et al. ......... 219/121.63 |
| 7,331,107 | B2 | * | 2/2008  | Follo et al. ............... 30/50 |
| 2007/0220751 | A1 | * | 9/2007  | Gratsias et al. ............... 30/32 |
| 2007/0266564 | A1 | * | 11/2007 | Gratsias et al. ............... 30/32 |

FOREIGN PATENT DOCUMENTS

| EP | 0 287 387 A1 | 10/1988 |
| EP | 0 287 387 B1 | 10/1988 |
| EP | 0 858 869 A1 | 8/1998  |
| EP | 0 858 869 B1 | 10/2002 |

* cited by examiner

*Primary Examiner*—Hwei-Siu C Payer
(74) *Attorney, Agent, or Firm*—Jones Day

(57) ABSTRACT

A method of producing a razor head, and razor head itself, having one or more blades, a first plastic member and a second plastic member, that includes the step of laser welding the first plastic member to the second plastic member.

9 Claims, 5 Drawing Sheets

RAZOR HEAD HAVING LASER WELDED PARTS AND METHOD OF PRODUCING THEREOF

This application is a national stage application of PCT/EP2004/005745, filed on May 6, 2004.

FIELD OF THE INVENTION

The embodiments of the present invention relate to a safety razor and, more specifically, to a method of producing a razor and a razor head.

BACKGROUND OF THE INVENTION

U.S. Pat. No. 5,276,967 to Ferraro discloses a wet-shaving razor unit including a seat portion, a cap portion, two blades and a spacer. The cap portion includes a plurality of securing pins that pass through a series of co-linear openings in the blades and spacer and are received by openings in seat portion that are dimensioned so that pins can be snapped in and, thereafter, not withdrawn. Pins are dimensioned so that once the blades are assembled, the components of such assembly are tightly sandwiched between the cap and seat portion.

One disadvantage of such a structure is that it is not totally safe. Sometimes the pins are not dimensioned so that they ensure a tight securement of the seat and cap portion. There is a risk that the seat and cap portion separate, thereby letting the blades scatter apart.

SUMMARY OF THE INVENTION

It is an object of the embodiments of the present invention to provide a razor structure which is safer.

It is also an object of the embodiments of the present invention to provide a method of producing a razor head and a razor which is simpler.

The method of producing a razor head according to the embodiments of the present invention include the steps of providing one or more blades, providing a first plastic member and a second plastic member, and laser welding the first plastic member to the second plastic member.

Accordingly, it is possible to strongly secure the different plastic parts of the razor head together.

In this case, the method may comprise the step of securing the blade to the guard member before laser welding the cap member to the guard member.

The embodiments of the present invention also provide a razor head having at least two plastic parts, i.e. a first plastic member and a second plastic member, which are laser welded to one another.

The first plastic member is, e.g. a guard member, and the second plastic member is a cap member.

The embodiments of the present invention also provide a method of producing a razor comprising several plastic parts, the method including at least one step of laser welding two plastic parts thereof.

The embodiments of the present invention further provides a razor having at least two plastic parts which are laser welded to one another.

The above and other objects and advantages of the embodiments of the present invention will become apparent from the detailed description of a preferred embodiment of the present invention, considered in conjunction with the accompanying drawings.

Figure 1:
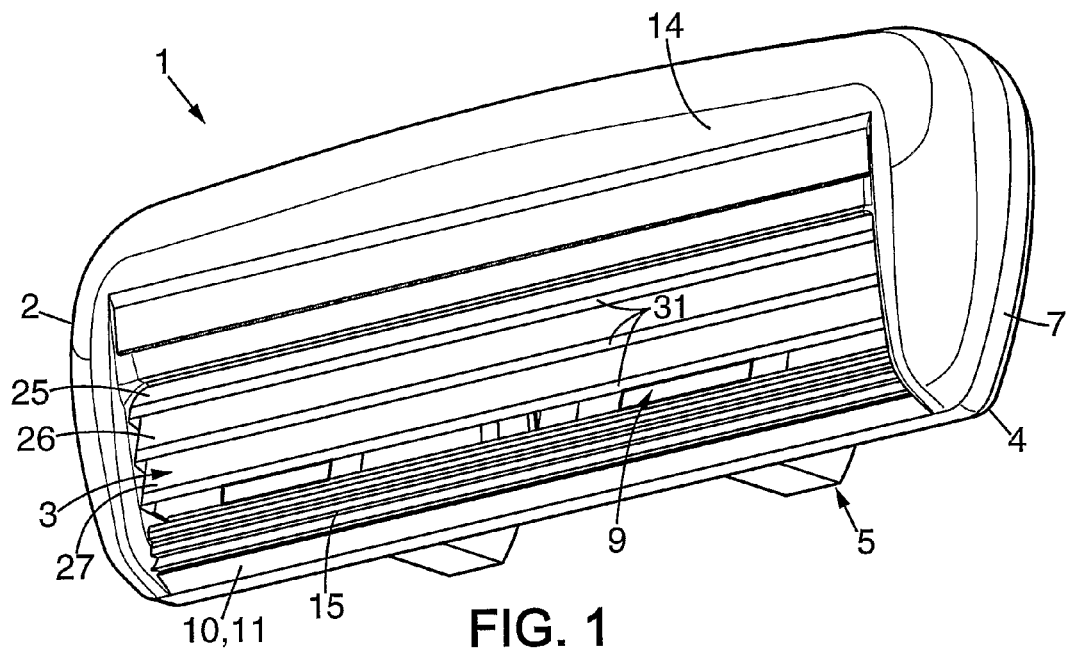
FIG. 1 is a perspective view of a razor head comprising three blades.

A razor head according to the embodiments of the present invention is indicated generally by reference number 1 in the drawings.

DETAILED DESCRIPTION OF THE DRAWINGS

Razor head 1 comprises a guard member 2, thereafter called platform guard, a blade assembly 3 which is mounted and secured to the platform guard 2, and a platform rear cap 4 having latching means for connection to a handle end.

Platform guard 2 has a substantially rectangular shape and comprises a flat base member 6 and a peripheral wall 7 projecting substantially perpendicular from the base member 6.

Peripheral wall 7 and base member 6 together define an internal volume 8 wherein blade assembly 3 is lodged during mounting of the razor head 1, as described hereinafter.

Platform guard 2 is provided with a rectangular shaped opening 9 which runs along the base member 6, thereby defining on the side opposite thereof a guard bar 10 in a straight peripheral wall portion 11.

Base member 6 has a substantially flat lower or internal surface 12, which is oriented towards the internal volume 8, and an opposite external or top surface 13.

Figure 5:
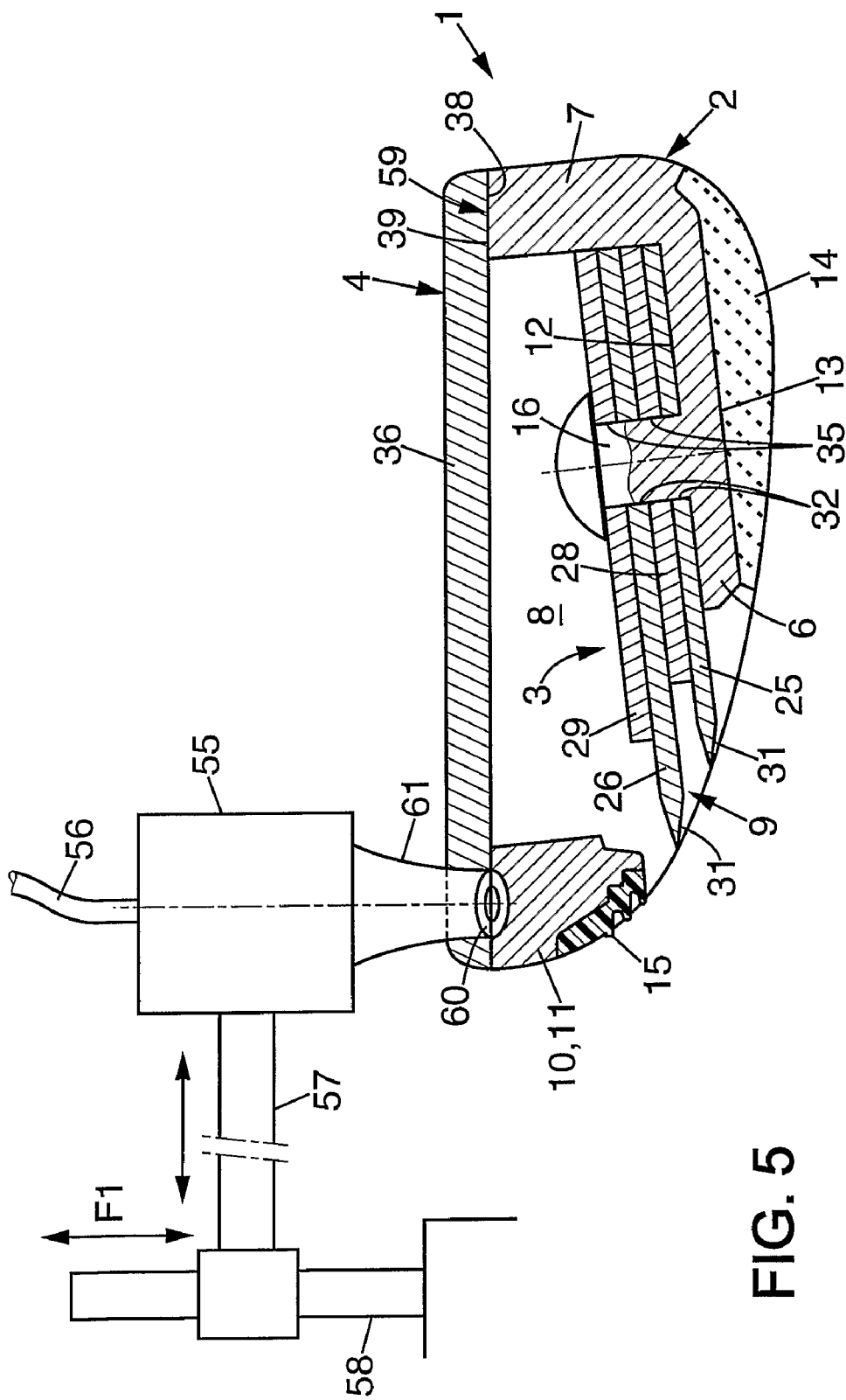
FIG. 5 is a cut-out view of the razor head of the preceding figures, showing laser welding thereof.

As depicted in FIG. 5, the razor head 1 is provided with a lube strip 14 which is glued to or co-injected together with the platform guard 2 onto the top surface 13, and with a skin contacting element 15 which is also glued to or co-injected together with the platform guard 2 onto the guard bar 10.

Figure 3:
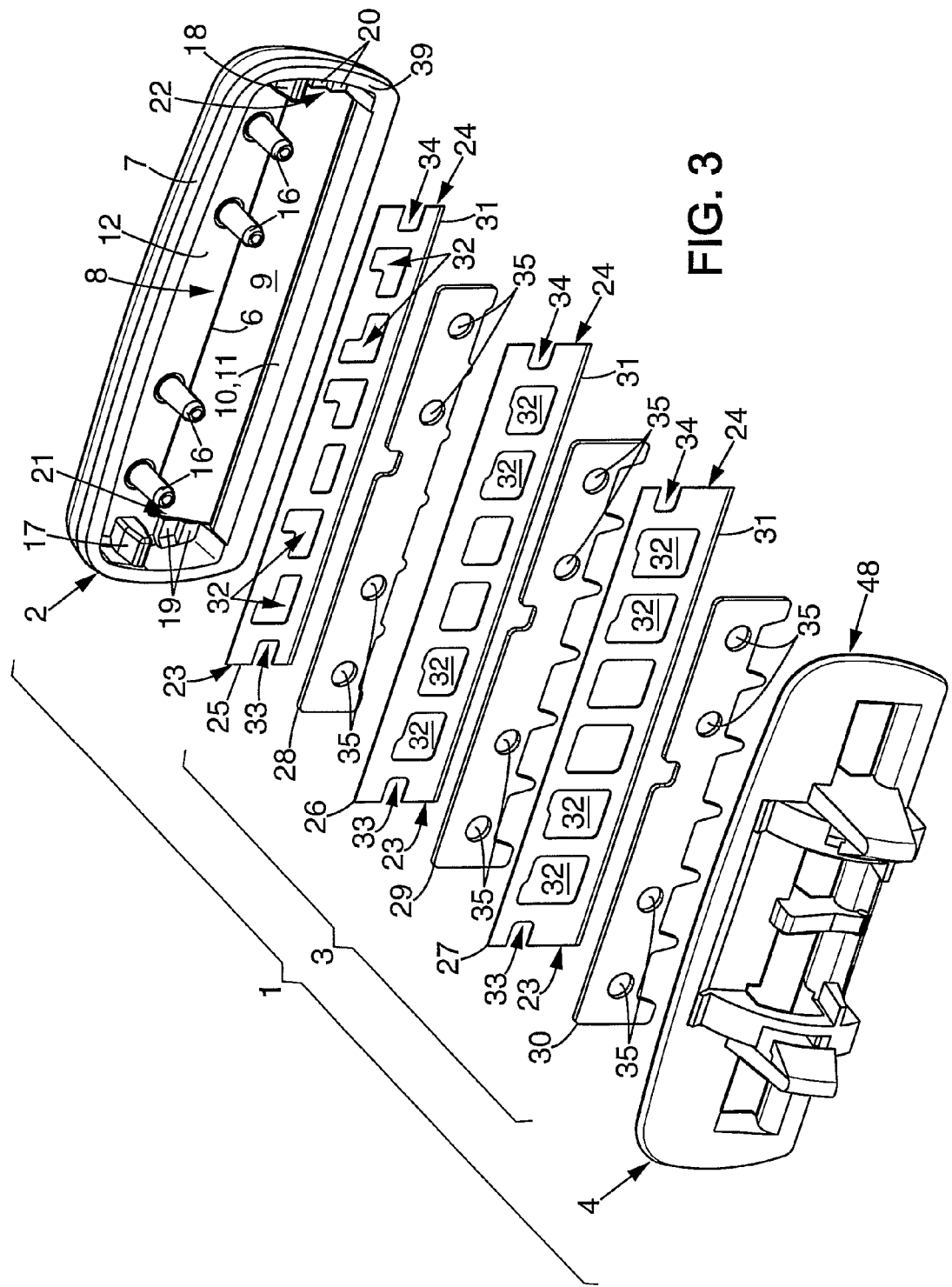
FIG. 3 is an exploded perspective view of the razor head of FIGS. 1 and 2, form the same point of view as in FIG. 2.
Figure 4:
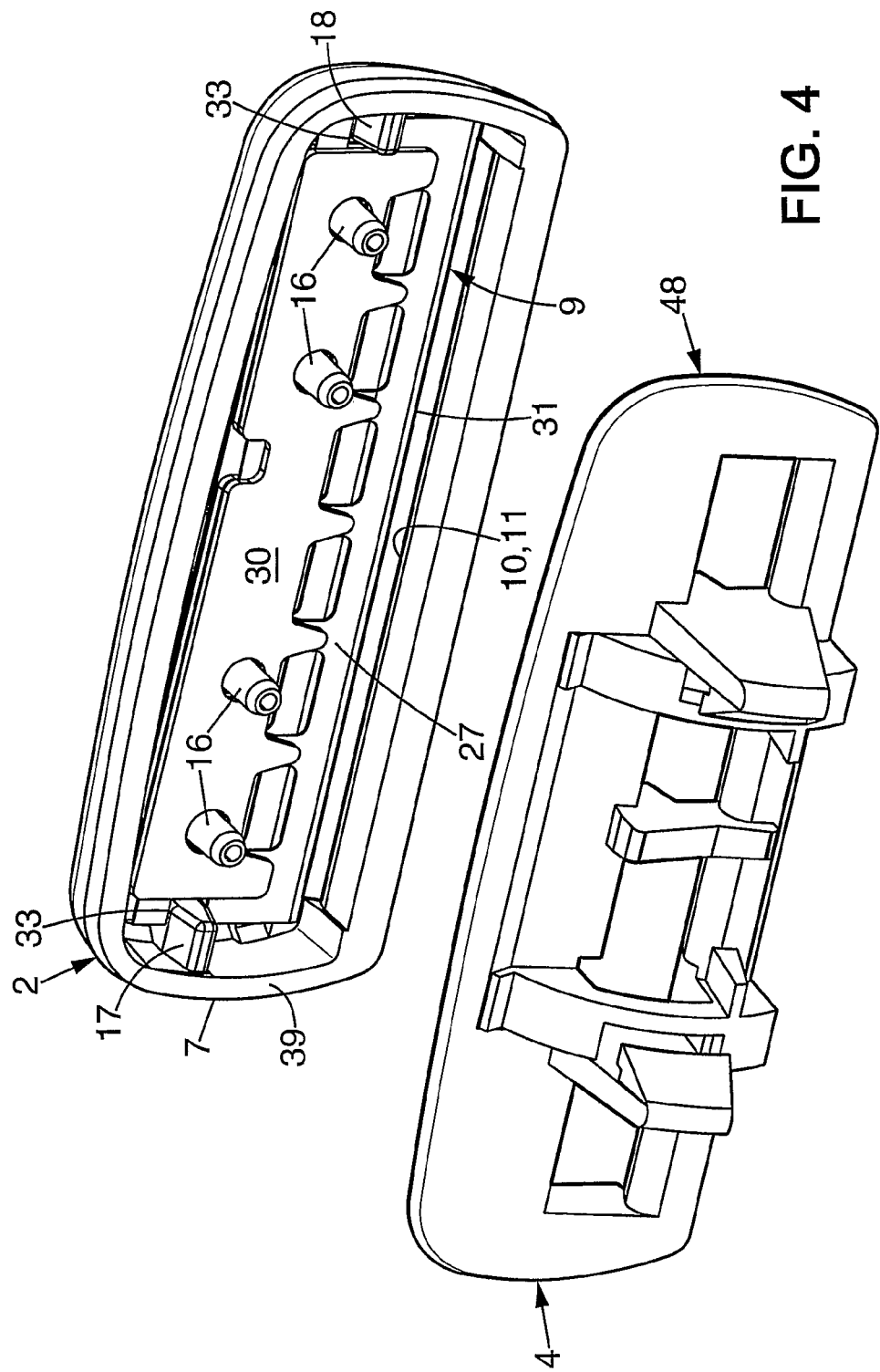
FIG. 4 is a perspective view of the razor head of FIGS. 1, 2 and 3, in a partially assembled state.

Platform guard 2 is provided with at least two securing pins 16 projecting substantially perpendicular from internal surface 12. As illustrated in FIG. 3, four securing pins 16 are preferably provided.

As depicted in FIG. 3, platform guard 2 is also provided with two positioning pins 17, 18, which are located opposite from one another at the junction between the peripheral wall 7 and the base member 6. Besides, platform guard 2 is provided with a tapered surface 19, 20 at each end 21, 22 of the rectangular opening 9, for receiving opposite ends 23, 24 of the blades.

Blade assembly 3 comprises at least one blade and one securing plate. In a preferred embodiment depicted in FIG. 3, blade assembly 3 comprises three blades 25, 26, 27, two spacers 28, 29 and a securing plate 30.

More precisely, blade assembly 3 comprises a narrow or primary blade 25, a narrow or primary spacer 28, an intermediate or secondary blade 26, an intermediate or secondary spacer 29, a wide or tertiary blade 27, and finally a securing plate 30.

Each blade 25, 26, 27 is formed of a stamped metal strip, a side of which was grinded to form a blade edge 31.

Each blade 25, 26, 27 is also provided with securing apertures 32 which are capable of cooperating with securing pins 16. Each blade 25, 26, 27 has two opposite ends 23, 24 which are provided with rectangular shaped cut-outs 33, 34 capable of cooperating with positioning pins 17, 18.

Correspondingly, the spacers 28, 29 and the securing plate 30, which are formed of a metal or plastic strip, are provided with holes 35 capable of cooperating with the securing pins 16. As will be seen thereafter, each spacer 28, 29 can be used as a securing plate 30 to be mounted onto the last blade.

Platform rear cap 4 comprises a substantially rectangular body 36 having the same contour as the platform guard 2.

A rectangular opening 37 is provided in the body 36 which has a flat rim 38 capable of cooperating with a top surface 39 of the peripheral wall 7 of the platform guard 2, as described hereinafter.

The platform rear cap 4 forms an adaptor mateable with a razor handle.

Figure 2:
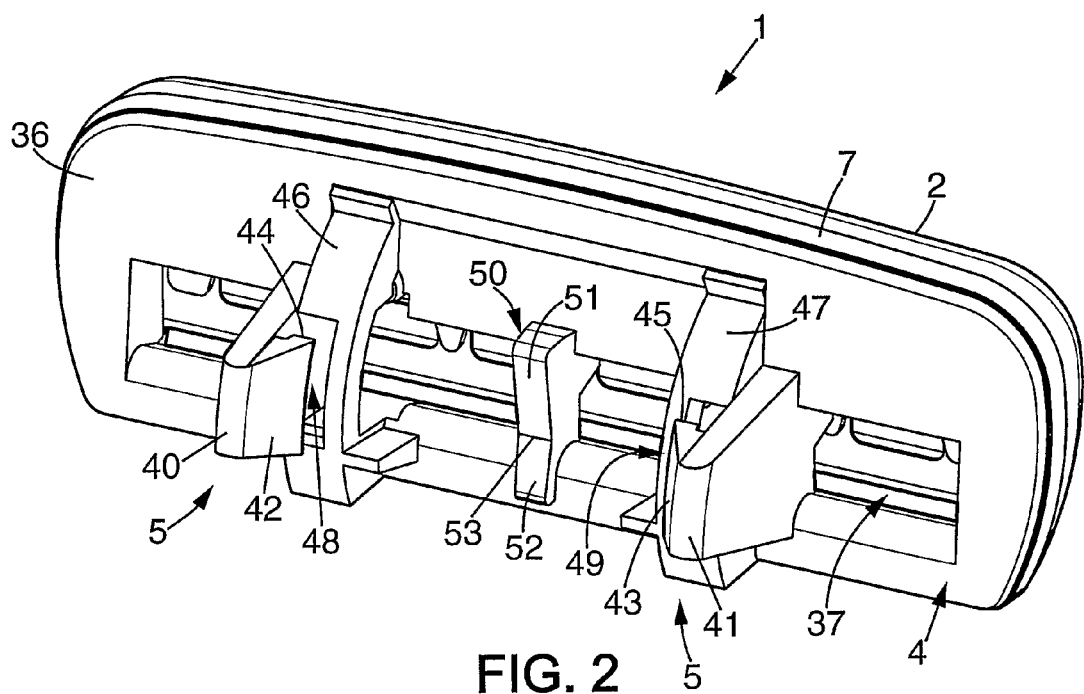
FIG. 2 is a perspective view of the razor head of FIG. 1, from a different point of view.

As depicted in FIG. 2, platform rear cap 4 is provided, on the side opposite to the platform guard 2, with two projecting retainers 40, 41 having, at their free ends, respectively, inwardly extending opposed rails 42, 4 3, each rail 42, 43 having a respective arcuate upper surface 44, 45 which faces a corresponding cylindrical surface 46, 47.

Rails 42, 43, in conjunction with corresponding cylindrical surfaces 46, 47, define arcuate slots 48, 49 which are adapted to receive shell bearings of a razor handle end on which the razor head 1 will be pivotally and removably attached through the platform rear cap 4.

In the middle of the retainers 40, 41, the platform rear cap 4 comprises cam means 50 in the form of a strut which extends substantially perpendicular through the opening 37, the strut 50 comprising cam surfaces 51, 52 joining at an apex 53, the surfaces 51, 52 defining therebetween an obtuse angle. Cam means 50 is adapted to receive a cam follower operative to urge the razor head 1 to a given rest position with respect to the razor handle.

Attachment of the razor head 1 to a handle end is described in further details in U.S. Pat. No. 4,492,025, the entire content of which is herewith incorporated by reference.

A method of producing a razor head 1 according to the embodiments of the present invention is described hereinafter.

Such a method comprises the steps of:
providing platform guard 2;
securing blade assembly 3 onto the platform guard 2;
providing platform rear cap 4;
securing the platform rear cap 4 to the platform guard 2 on the same side as the blade assembly 3.

Depending on the number of blades in the blade assembly 3, several embodiments are provided for carrying the step of securing the blade assembly 3 onto platform guard 2.

One Blade

In a razor head 1 having one blade 25 only, the step of securing the blade assembly 3 onto the platform guard 2 comprises the steps of:
providing the blade 25 with the securing apertures 32 and the cut-outs 33, 34 in alignment with the securing pins 16 and the positioning pins 17, 18, respectively;
mounting the blade 25 onto the platform guard 2, the blade 25 abutting against the internal surface 12 of the base member 6, the securing pins 16 passing through the securing apertures 32, the positioning pins 17, 18 cooperating with the cut-outs 33, 34, the blade ends 23, 24 abutting against tapered surfaces 19, 20 and the blade edge 31 extending through and along the rectangular opening 9 in the platform guard 2;
providing a securing plate (i.e. spacer 28) with the holes 35 thereof in alignment with the sucuring pins 16;
mounting the securing plate 28 onto the platform guard 2, over the blade 25;
forming a crimping head 54 at one end of each securing pin 16, thereby riveting the one-blade assembly 3 onto the platform guard 2.

Two Blades

In a razor head 1 having two blades 26, 27 (as 30 depicted in FIG. 5), the step of securing the blade assembly 3 onto the platform guard 2 comprises the steps of:
providing a narrow or primary blade 25 with the securing apertures 32 and the cut-outs 33, 34 in alignment with the securing pins 16 and the positioning pins 17, 18, respectively;
mounting the primary blade 25 onto the platform guard 2, the blade 25 abutting against the internal surface 12 of the base member 6, the securing pins 16 passing through the securing apertures 32, the positioning pins 17, 18 cooperating with the cut-outs 33, 34, the blade ends 23, 24 abutting against tapered surfaces 19, 20 and the blade edge 31 extending through and along the rectangular opening 9 in the platform guard 2;
providing a primary spacer 28 with the holes 35 in alignment with the securing pins 16;
mounting the primary spacer 28 onto the platform guard 2 over the primary blade 25, the securing pins 16 passing through the holes 35 of the primary spacer 28;
providing a secondary blade 26, the securing apertures 32 and the cut-outs 33, 34 being in alignment with the securing pins 16 and the positioning pins 17, 18, respectively;
mounting the secondary blade 26 onto the platform guard 2 over the primary spacer 28, the securing pins 16 passing through the securing apertures 32, the positioning pins 17, 18 cooperating with the cut-outs 33, 34, the blade ends 23, 24 abutting against tapered surfaces 19, 2G, and the blade edge 31 extending through and along the rectangular opening 9 provided in the platform guard 2;
providing a securing plate (i.e. spacer 29) with holes 35 in alignment with the securing pins 16;
mounting the securing plate 29 onto the platform guard 2 over the secondary blade 26;
forming a crimping head 54 at one end of each securing pin 16, thereby riveting the two-blade assembly 3 onto the platform guard 2.

Three Blades (Preferred)

In a razor head 1 having three blades 25, 26, 27 (depicted in FIG. 3), the step of securing the blade assembly 3 onto the platform guard 2 comprises the steps of:
providing a narrow or primary blade 25 with the securing apertures 32 and the cut-outs 33, 34 in alignment with the securing pins 16 and the positioning pins 17, 18, respectively;
mounting the primary blade 25 onto the platform guard 2, the blade 25 abutting against the internal surface 12 of the base member 6, the securing pins 16 passing through the securing apertures 32, the positioning pins 17, 18 cooperating with the cut-outs 33, 34, the blade ends 23, 24 abutting against tapered surfaces 19, 20 and the blade edge 31 extending through and along the rectangular opening 9 in the platform guard 2;
providing a primary spacer 28 with the holes 35 in alignment with the securing pins 16;
mounting the primary spacer 28 onto the platform guard 2 over the primary blade 25, the securing pins 16 passing through the holes 35 of the primary spacer 28;

providing a secondary blade 26, the securing apertures 32 and the cut-outs 33, 34 being in alignment with the securing pins 16 and the positioning pins 17, 18, respectively;

mounting the secondary blade 26 onto the platform guard 2 over the primary spacer 28, the securing pins 16 passing through the securing apertures 32, the positioning pins 17, 18 cooperating with the cut-outs 33, 34, the blade ends 23, 24 abutting against tapered surfaces 19, 20, and the blade edge 31 extending through and along the rectangular opening 9 provided in the platform guard 2;

providing a wide or tertiary blade 27 with the securing apertures 32 and the cut-outs 33, 34 in alignment with the securing pins 16 and the positioning pins 17, 18, respectively;

mounting the tertiary blade 27 onto the platform guard 2 over the secondary spacer 29, the securing pins 16 passing through the securing apertures 32, the positioning pins 17, 18 cooperating with the cut-outs 33, 34, the blade ends 23, 24 abutting against tapered surfaces 19, 20 and the blade edge 31 extending through and along the rectangular opening 9 provided in the platform guard 2;

providing a securing plate 30 with holes 35 in alignment with the securing pins 16;

mounting the securing plate 30 onto the platform guard 2 over the tertiary blade 27;

forming a crimping head 54 at one end of each securing pin 16, thereby riveting the three-blade assembly 3 onto the platform guard 2.

Four Blades

In a razor head having four blades, the step of securing the blade assembly onto the platform guard comprises the steps of:

providing a narrow or primary blade with the securing apertures and the cut-outs in alignment with the securing pins and the positioning pins, respectively;

mounting the primary blade onto the platform guard, the blade abutting against the internal surface of the base member, the securing pins passing through the securing apertures, the positioning pins cooperating with the cut-outs, the blade ends abutting against tapered surfaces and the blade edge extending through the rectangular opening in the platform guard;

providing a primary spacer with the holes in alignment with the securing pins;

mounting the primary spacer onto the platform guard over the primary blade, the securing pins passing through the holes of the primary spacer;

providing a secondary blade, the securing apertures and the cut-outs being in alignment with the securing pins and the positioning pins, respectively;

mounting the secondary blade onto the platform guard over the primary spacer, the securing pins passing through the securing apertures, the positioning pins cooperating with the cut-outs, the blade ends abutting against tapered surfaces and the blade edge extending through the rectangular opening provided in the platform guard;

providing a wide or tertiary blade with the securing apertures and the cut-outs in alignment with the securing pins and the positioning pins, respectively;

mounting the tertiary blade onto the platform guard over the secondary spacer, the securing pins passing through the securing apertures, the positioning pins cooperating with the cut-outs, the blade ends abutting against tapered surfaces and the blade edge extending through the rectangular opening provided in the platform guard;

providing a tertiary spacer with holes in alignment with the securing pins;

mounting the tertiary spacer onto the platform guard over the tertiary blade;

providing a fourth blade, wider than the tertiary blade, the securing apertures and the cut-outs of the fourth blade being in alignment with the securing pins and the positioning pins, respectively;

mounting the fourth blade onto the platform guard over the tertiary spacer, the securing pins passing through the securing apertures, the positioning pins cooperating with the cut-outs, the blade ends abutting against tapered surfaces and the blade edge extending through the rectangular opening in the platform guard;

providing a securing plate with holes in alignment with the securing pins;

mounting the securing plate onto the platform guard, the securing pins passing through the holes;

forming a crimping head at one end of each securing pins, thereby riveting the blade assembly onto the platform guard.

Accordingly, no matter the number of blades, the step 25 of riveting the blade assembly 3 to the platform guard 2 is achieved before the step of mounting the platform rear cap 4. In other words, the blade assembly 3 is fixed to the platform guard 2 separately and independently from the platform rear cap 4, so that, in case an accidental 30 separation of the platform rear cap 4 from the platform guard 2 occurs, scattering of the blades is avoided.

In addition, since the blade assembly 3 is fixed to the platform guard 2 independently from the platform rear cap 4, it is possible to strongly fix the latter to the 35 platform guard 2, as described hereinafter.

Furthermore, since the securing pins 16 hold the blade assembly 3 only, which is sandwiched by the securing plate, the securing pins are shorter than the ordinary ones, so that they are stronger and there is less risk 5 that the blades be accidentally detached from the platform guard 2.

As illustrated in FIGS. 2 and 5, the platform rear cap 4 forms a cover which, when secured onto the platform guard 2, closes the internal volume 8 wherein the blade 10 assembly 3 is unreachably lodged.

Of course, the thickness of the platform guard 2, i.e. the height of the peripheral wall 7, shall be adapted to the thickness of the blade assembly 3, depending on the number of blades.

As depicted in FIG. 5, after the blade assembly 3 has been riveted, the crimping heads 54 do not project outside from the internal volume 8 of the platform guard 2, so that when mounted onto the platform guard 2, the platform rear cap 4 is not prevented from abutting against the peripheral wall 7 of the platform guard 2.

Figure 6:
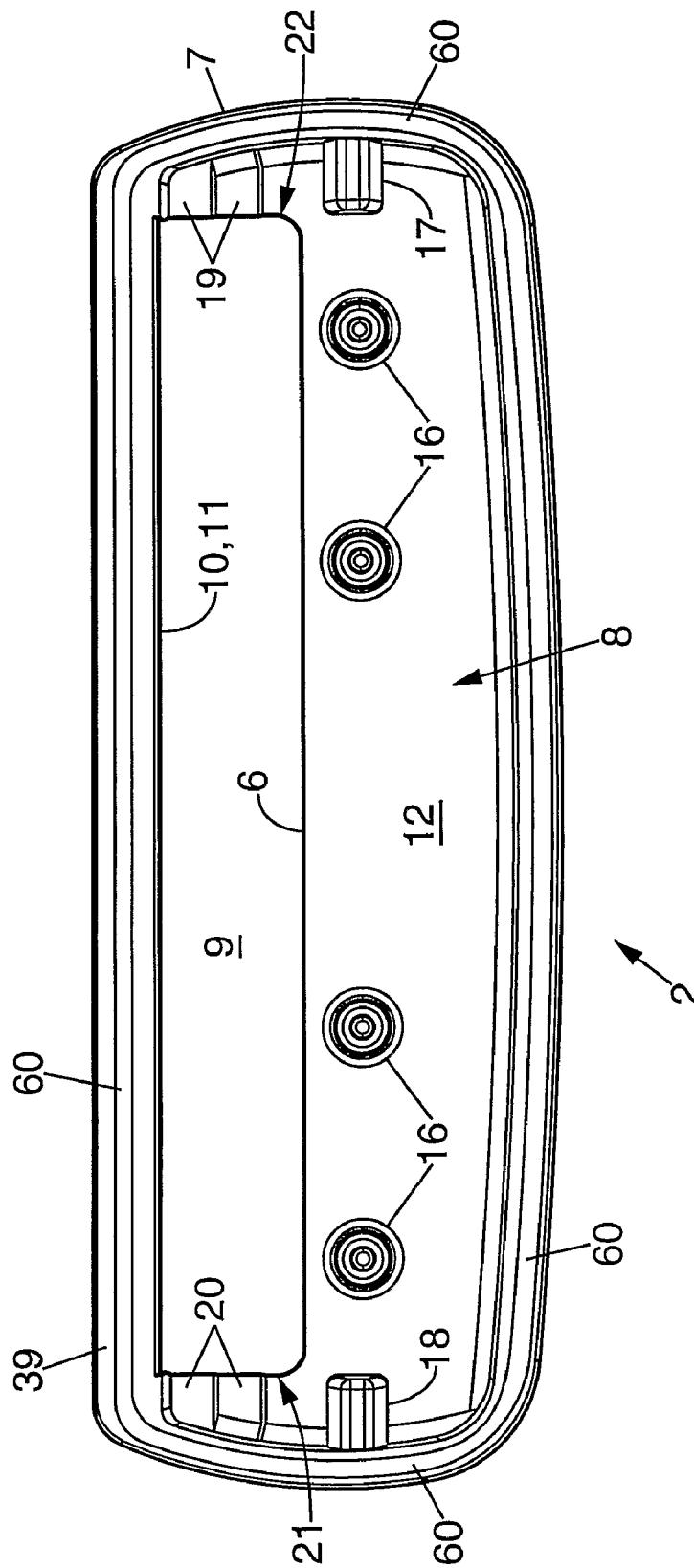
FIG. 6 is a top plan view of a platform guard of the razor head of the preceding figures.

As further depicted in FIG. 5, the platform rear cap 4 is laser welded onto the platform guard 2. There is provided a laser source which is connected to a laser welding head 55 through a flexible laser beam guiding element 56. The laser welding head 55 is mounted onto an arm 57 which is, in turn, slidingly mounted on a clamping element 58 in a direction perpendicular to an interface 59 between the platform rear cap 4 and the platform guard 2, as shown by arrow F1. Moreover, the laser welding head 55 is slideable, with respect of the clamping element 58, in both directions in a plan substantially parallel to the interface 59 between the platform rear cap 4 and the platform guard 2f so that the laser welding head 55 can move along a predetermined welding path 60 illustrated in FIG. 6, which follows the contour of the peripheral wall 7.

In a preferred embodiment illustrated in FIG. 5, platform guard 2 is mounted on the bottom side of the assembly, while the platform rear cap 4 is mounted on the top thereof. As a laser beam 61 comes from the top, the platform rear cap 4 and the platform guard 2 have to be made of suitable polymers in order to allow laser welding. In this particular case, platform rear cap 4 has to be transparent to the laser beam 61 while platform guard 2 has, on the contrary, to be absorbing. As the laser wave length is outside the visible range, both pieces 2, 4 may be dyed according to the wishes of the manufacturer, provided that they present sufficient transparency and opacity to the laser beam 61, respectively.

Besides, the interface 59 formed by overlapping of the platform rear cap 4 and the platform guard 2 (i.e. by conjunction of rim 38 and top surface 39) must be of sufficient area to prevent the welding path or melting zone 60 from reaching the edges of the interface 59. The laser welding method is described in further details in U.S. Pat. No. 6,201,211, the entire content of which is herewith incorporated by reference.

As described here above, this welding method is used to laser weld the platform rear cap 4 to the platform guard 2, since there is a need for strongly securing both pieces 2, 4 to each other in order to avoid separation during shaving, which could injury the user's face (or other body areas to be shaved). There is also a need for preventing a child who would be playing with the razor from easily separating the platform rear cap 4 from the platform guard, thereby easily accessing the blades.

Laser welding could also be used to weld other plastic parts of the razor, which need to be strongly secured together.

For instance, in a razor having a handle comprising several plastic parts, the method of producing the razor according to an embodiment of the present invention comprises a step of laser welding together at least two plastic parts of the handle.

The technique of laser welding may be the same as previously recited. Therefore, one of the plastic part has to be transparent in order to allow transmission of the laser beam, while the other part has to be absorbing.

The one part may be an upper member of the handle and the other a lower member, the upper and the lower members being laser welded together to form the whole handle.

A decorative insert (e.g. for an advertising purpose) may be sandwiched between the upper and the lower members, the insert being visible through the transparent upper member.

The invention claimed is:

1. A method of producing a razor head including one or more blades, a plastic guard member and a plastic cap member, the plastic guard member having an internal surface and a peripheral wall defining an internal volume, the method comprising the steps of:
   a) securing the one or more blades fixedly to the plastic guard member separately and independently from the plastic cap member with a securing pin and forming a crimping head at one end of the pin to rivet the blades onto the plastic guard member, the one or more blades being disposed in the internal volume without projecting outside of the internal volume so that when mounted on the plastic guard member, the plastic cap member abuts against the peripheral wall of the plastic guard member, and
   b) mounting the plastic cap member and then laser welding the plastic cap member onto the peripheral wall of the plastic guard member with a laser beam, the step of securing the one or more blades fixedly to the plastic guard member being achieved before the step of mounting the plastic cap member.

2. A method of producing a razor head including one or more blades, a plastic guard member and a plastic cap member comprising the steps of:
   a) providing one or more blades, a plastic guard member and a plastic cap member,
   b) securing the one or more blades fixedly to the plastic guard member separately and independently from the plastic cap member, the plastic guard member having an internal surface and a peripheral wall defining an internal volume,
   c) bringing together the plastic cap member to the plastic guard member and mounting the plastic cap member, the one or more blades being disposed in the internal volume without projecting outside of the internal volume so that when mounted onto the plastic guard member, the plastic cap member abuts against the peripheral wall of the plastic guard member, the step of securing the one or more blades fixedly to the plastic guard member being achieved before the step of mounting the plastic cap member, and
   d) laser welding the plastic cap member onto the peripheral wall of the plastic guard member with a laser beam.

3. The method according to claim 1 or 2, further comprising the step of forming an interface between the cap member and the guard member when bringing together the cap member to the guard member, the interface having edges and a sufficient area to prevent a melting zone from reaching the edges of the interface.

4. The method according to claim 3, wherein the laser beam is slidable in a direction perpendicular to the interface.

5. The method according to claim 3, wherein the laser beam is slidable in a plane substantially perpendicular to the interface.

6. The method according to claim 2, wherein when bringing together the cap member to the guard member, they form an assembly having a bottom side and a top side, the guard member being mounted on the bottom side of the assembly, while the cap member is on the top side of the assembly.

7. The method according to claim 3, wherein when bringing together the cap member to the guard member, they form an assembly having a bottom side and a top side, the guard member being mounted on the bottom side of the assembly, while the cap member is on the top side of the assembly.

8. The method according to claim 4, wherein when bringing together the cap member to the guard member, they form an assembly having a bottom side and a top side, the guard member being mounted on the bottom side of the assembly, while the cap member is on the top side of the assembly.

9. The method according to claim 5, wherein when bringing together the cap member to the guard member, they form an assembly having a bottom side and a top side, the guard member being mounted on the bottom side of the assembly, while the cap member is on the top side of the assembly.

* * * * *